Oct. 18, 1927.

E. E. DE VORE 1,645,855

WIND MOTOR

Filed July 6, 1926

INVENTOR.
ERNEST E. DE VORE
BY
ATTORNEYS.

Oct. 18, 1927.

E. E. DE VORE 1,645,855

WIND MOTOR

Filed July 6, 1926

INVENTOR.
ERNEST E. DE VORE
BY Munn & Co.
ATTORNEYS.

Patented Oct. 18, 1927.

1,645,855

UNITED STATES PATENT OFFICE.

ERNEST E. DE VORE, OF MOUNT WILSON, CALIFORNIA.

WIND MOTOR.

Application filed July 6, 1926. Serial No. 120,819.

My invention relates generally to fluid motors and more particularly, although not necessarily, to wind motors.

A purpose of my invention is the provision of a wind motor having certain advantages, among which are the following: Simplicity, durability and low construction cost; relatively few moving parts; capability of being constructed in any size and particularly in large sizes without sacrificing speed; ability to operate in changing winds without loss of torque; immune to the retarding action of interfering air currents, and a motor capable of utilizing the power of winds blowing in different directions and at different altitudes at one and the same time, and in a manner to develop a relatively high torque at low pressures, rendering it particularly useful for operating wind pumps.

It is also a purpose of my invention to provide a wind motor having a power wheel and a booster wheel which functions to greatly aid the wind in the propulsion of the power wheel and in such manner that the power wheel in turn directs air currents against the booster wheel so that the latter attains a relatively high speed.

I will describe only one form of wind motor embodying my invention, and will then point out the novel features in claims.

Figure 1:
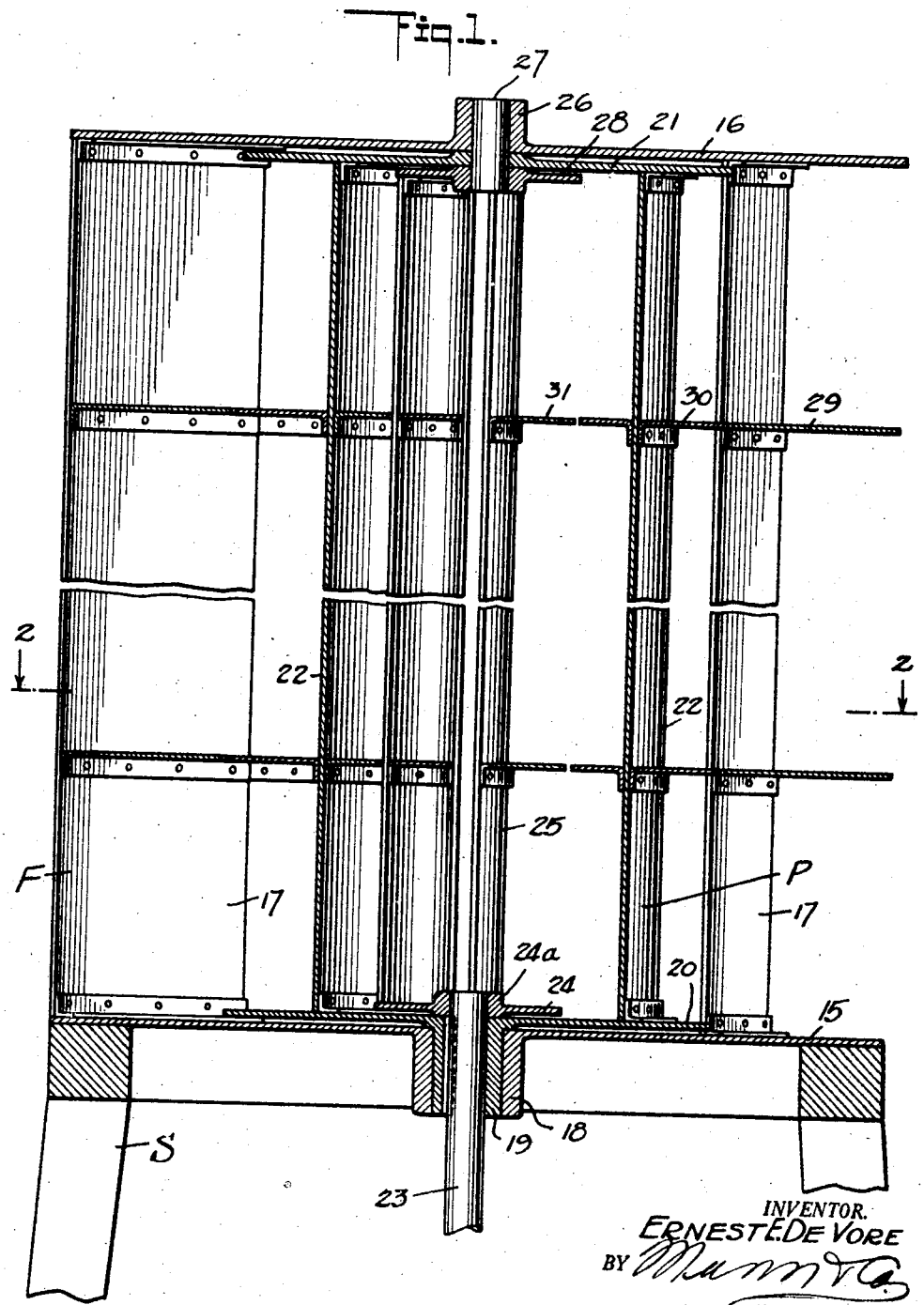
Figure 1 is a view showing in central vertical section one form of wind motor embodying my invention.

Referring specifically to the drawings, my invention in its present embodiment comprises a suitable support S upon which is secured a fixed wheel F comprising a bottom head or plate 15 and a top head or plate 16, the two being connected at circumferentially spaced intervals by vanes 17. The bottom head 15 is formed centrally with a hub 18 in which is journaled a hub 19 comprising part of a bottom head or plate 20 of a power wheel P. The power wheel includes a top head or plate 21 and the top and bottom heads are connected at circumferentially spaced intervals by blades 22 which, as clearly illustrated in Figure 2, are transversely curved on arcs substantially tangent with respect to a booster wheel B.

Keyed within the hub 19 is a power shaft 23, the shaft extending above the hub and thereby forming a mounting for a hub 24ª of a bottom head or plate 24 of the booster wheel B. The hub 24ª is freely rotatable on the upper end of the shaft so that it can rotate as a unit independently of the power wheel P. The upper head 16 of the fixed wheel F is formed centrally with a hub 26 in which a stub axle 27 is mounted, the stub axle depending from the hub and extending into the upper head 21 of the power wheel P and the upper head 28 of the booster wheel B and all in a manner that the heads 21 and 28 are freely rotatable on the stub axle. The heads 24 and 28 are connected by a plurality of blades 25, these blades being of arcuate form in cross section and spaced about the axis of the booster wheel.

Partitions 29, 30 and 31 are provided respectively for the wheels F, P and B, and as clearly shown in Figure 1 these partitions are arranged fixedly secured to the vanes or blades in a horizontal position so as to span the space between adjacent blades or vanes. In the present instance, I have shown two sets of partitions spaced from each other and from the heads of the wheels, this arrangement operating to prevent the circulation of air currents upwardly or downwardly between the blades.

Figure 2:
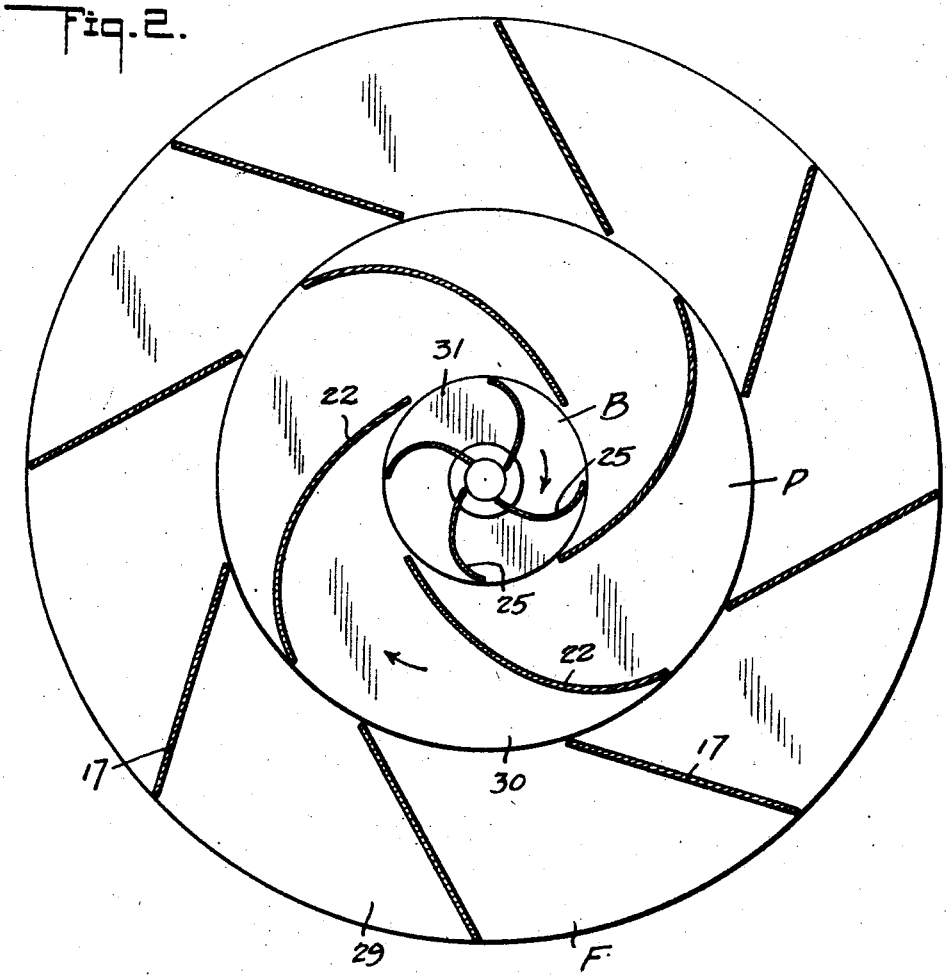
Figure 2 is a horizontal sectional view taken on the line 2—2 of Figure 1.

In the operation of the wind motor, the vanes 17 of the fixed wheel F, although of linear form in cross section, are arranged substantially at a tangent with respect to the power wheel P so as to direct a wind blowing horizontally in one direction against the motor or a plurality of winds blowing in different horizontal directions against the motor inwardly against the concave sides of the blades 22 and to thereby utilize the wind or winds in propelling the power wheel in a clockwise direction as when viewed in Figure 2. By reference to Figure 2 it will be clear that any one air current after impinging upon the concave side of any particular blade 22 will be directed from the inner vertical edge of the blade into the booster wheel and in such manner as to cause the air current to impinge against the concave side of one of the blades 25. Thus the combined air currents from the several power wheel blades are utilized in acting upon the concave sides of the several blades of the booster wheel in effecting propulsion of the booster wheel and in the same direction as the power wheel. With the booster wheel rotating, the convex sides of the blades thereof function in their rotative movement to generate air currents in advance thereof which are caused to impinge against the concave sides of the power wheel blades, thus aiding the wind in propelling the power wheel. Further, the rotative movement of the blades 25 operates to displace air or create a negative pressure at the convex sides of the power wheel blades so that the latter may move against the wind with minimum resistance. It will be seen, therefore, that the rotative movement of the booster wheel greatly aids the wind in the propulsion of the power wheel.

The blades of the power wheel in turn function as a protector for the booster wheel and more particularly for that part of the booster wheel which is moving toward the wind, it being understood the blades 22 form a shield to prevent the wind from blowing directly against the blades 25 and thus retarding rotative movement of the booster wheel.

Although my invention has been described as a wind motor, it is to be understood that it may function as a water motor, and it may be applicable as an auxiliary driving means for ships in which it would be capable of utilizing the magnus force of a revolving cylinder, in which event the fixed wheel F would be dispensed with.

The partitions 29 and 30 and 31 as previously mentioned prevent air currents from moving longitudinally between the blades. Should winds impinge against the blades and vanes of the motor in any direction other than a horizontal direction, the partitions will serve to deflect the wind to a horizontal so that it will impinge against the surfaces of the vanes and blades substantially at right angles, to get the full force of an up or down air current.

Although I have herein shown and described only one form of wind motor embodying my invention, it is to be understood that various changes and modifications may be made therein without departing from the spirit of the invention and the spirit and scope of the appended claims.

I claim:

1. A wind motor comprising a power wheel mounted to rotate about a fixed axis and having transversely curved blades extending in arcs substantially tangent with respect to the axis of the wheel and spaced about its axis, and a booster wheel within the power wheel rotatable independently thereof, the booster wheel having arcuate blades adapted to receive currents of air from the blades of the power wheel in a manner to rotate the booster wheel and thus generate and distribute air currents which assist in the rotation of the power wheel.

2. A wind motor comprising a power wheel mounted to rotate about a fixed axis and having transversely curved blades extending in arcs substantially tangent with respect to the axis of the wheel and spaced about its axis, and a booster wheel within the power wheel rotatable independently thereof, the booster wheel having arcuate blades adapted to receive currents of air from the blades of the power wheel in a manner to rotate the booster wheel and thus generate air currents which assist in the rotation of the power wheel, and to create negative pressures at the windward side of the blades of the power wheel to assist the latter as they move against the wind.

3. A wind motor as embodied in claim 1, wherein the arrangement of the power wheel blades with respect to the booster wheel blades is such that the former act as shields for the latter as they move in a direction against the wind actuating the power wheel.

4. A wind motor as embodied in claim 2, wherein the arrangement of the power wheel blades with respect to the booster wheel blades is such that the former act as shields for the latter as they move in a direction against the wind actuating the power wheel.

5. A wind motor comprising a power wheel mounted to rotate about a fixed axis and having transversely curved blades extending in arcs substantially tangent with respect to the axis of the wheel and spaced about its axis, a booster wheel within the power wheel rotatable independently thereof, the booster wheel having arcuate blades adapted to receive currents of air from the blades of the power wheel in a manner to rotate the booster wheel and thus generate and distribute air currents which assist in the rotation of the power wheel, and a fixed wheel surrounding the power wheel and having vanes substantially at tangents with respect to the power wheel.

6. A wind motor as embodied in claim 1 wherein the arrangement of the power wheel blades with respect to the booster wheel blades is such that the former act as shields for the latter as they move in a direction against the wind actuating the power wheel, and a fixed wheel surrounding the power wheel and having vanes substantially at tangents with respect to the power wheel.

7. A wind motor comprising a power wheel mounted to rotate about a fixed axis and having transversely curved blades extending in arcs substantially tangent with respect to the axis of the wheel and spaced about its axis, and a booster wheel within the power wheel, the booster wheel having arcuate blades adapted to receive currents of air from the blades of the power wheel in a manner to rotate the booster wheel in the same direction as the power wheel and thus generate and distribute air currents which assist in the rotation of the power wheel.

8. A fluid motor comprising a power wheel, and a booster wheel rotatable independently of the power wheel and having means adapted to receive currents of air from the power wheel in a manner to rotate the booster wheel and thus generate and distribute air currents which act directly on the power wheel to assist in rotating the latter.

9. A fluid motor comprising a power wheel, and a booster wheel rotatable independently of the power wheel and having means adapted to receive currents of air from the power wheel in a manner to rotate the booster wheel and thus generate and distribute air currents which act directly on the power wheel to assist in rotating the latter, and to create negative pressures at the windward side of the blades of the power wheel to assist the latter as they move against the wind.

10. A fluid motor comprising a power wheel and a booster wheel rotatable independently of the power wheel and having means adapted to receive currents of air from the power wheel in a manner to rotate the booster wheel and thus generate and distribute air currents which act directly on the power wheel to assist in rotating the latter, and a fixed wheel having vanes substantially at tangents with respect to the power wheel.

ERNEST E. DE VORE.